United States Patent [19]

Neiditch et al.

[11] Patent Number: 4,485,210

[45] Date of Patent: Nov. 27, 1984

[54] PROCESS FOR THE CONTINUOUS PRODUCTION OF STAR-BLOCK COPOLYMERS OF A MONOVINYL AROMATIC MONOMER AND A CONJUGATED DIENE

[75] Inventors: David S. Neiditch, Evansville, Ind.; Gerald A. Bullano, Glen Mills, Pa.; Robert J. DiLullo, Paoli, Pa.; David E. Ofstein, West Chester, Pa.

[73] Assignee: Atlantic Richfield Company, Los Angeles, Calif.

[21] Appl. No.: 482,385

[22] Filed: Apr. 6, 1983

[51] Int. Cl.$^3$ .............................................. C08F 297/04
[52] U.S. Cl. ...................... 525/53; 525/271; 525/314; 422/134; 422/135; 422/138
[58] Field of Search .......................... 525/53, 314, 171

[56] References Cited

U.S. PATENT DOCUMENTS

| | | | |
|---|---|---|---|
| 3,454,675 | 7/1969 | Scoggin | 525/53 |
| 4,209,599 | 7/1980 | Brady et al. | 526/64 |
| 4,346,193 | 8/1982 | Warfel | 525/314 |
| 4,442,273 | 4/1984 | Neiditch et al. | 526/88 |

FOREIGN PATENT DOCUMENTS 49-38029 10/1974 Japan ..................................... 525/53

Primary Examiner—Wilbert J. Briggs, Sr.
Attorney, Agent, or Firm—Lewis J. Young

[57] ABSTRACT

A continuous process for producing star-block copolymer of a monovinyl aromatic monomer and a conjugated diene by continuously forming a vinyl aromatic polymer having a low weight average molecular weight to number average molecular weight ratio in a first reactor by anionic initiation in a solution of inert solvent; discharging a solution of polymer from the first reactor and passing the solution to a second sealed, cylindrical, pressurized, vertical reactor having a bottom zone, top zone and a plurality of intermediate zones separated by separation plates, each having a central aperture and mixing shaft passing therethrough, with the mixture passing to successive zones through an annular space formed between the shaft and each separation plate. The continuously produced solution of diblock copolymer is removed from the top zone of the second reactor and mixed with a polyfunctional coupling agent in a third reactor to produce a solution of star-block copolymer, with that solution discharged from the third reactor and contacted with a terminating agent, and the resultant star-block copolymer separated from the solvent.

7 Claims, 1 Drawing Figure

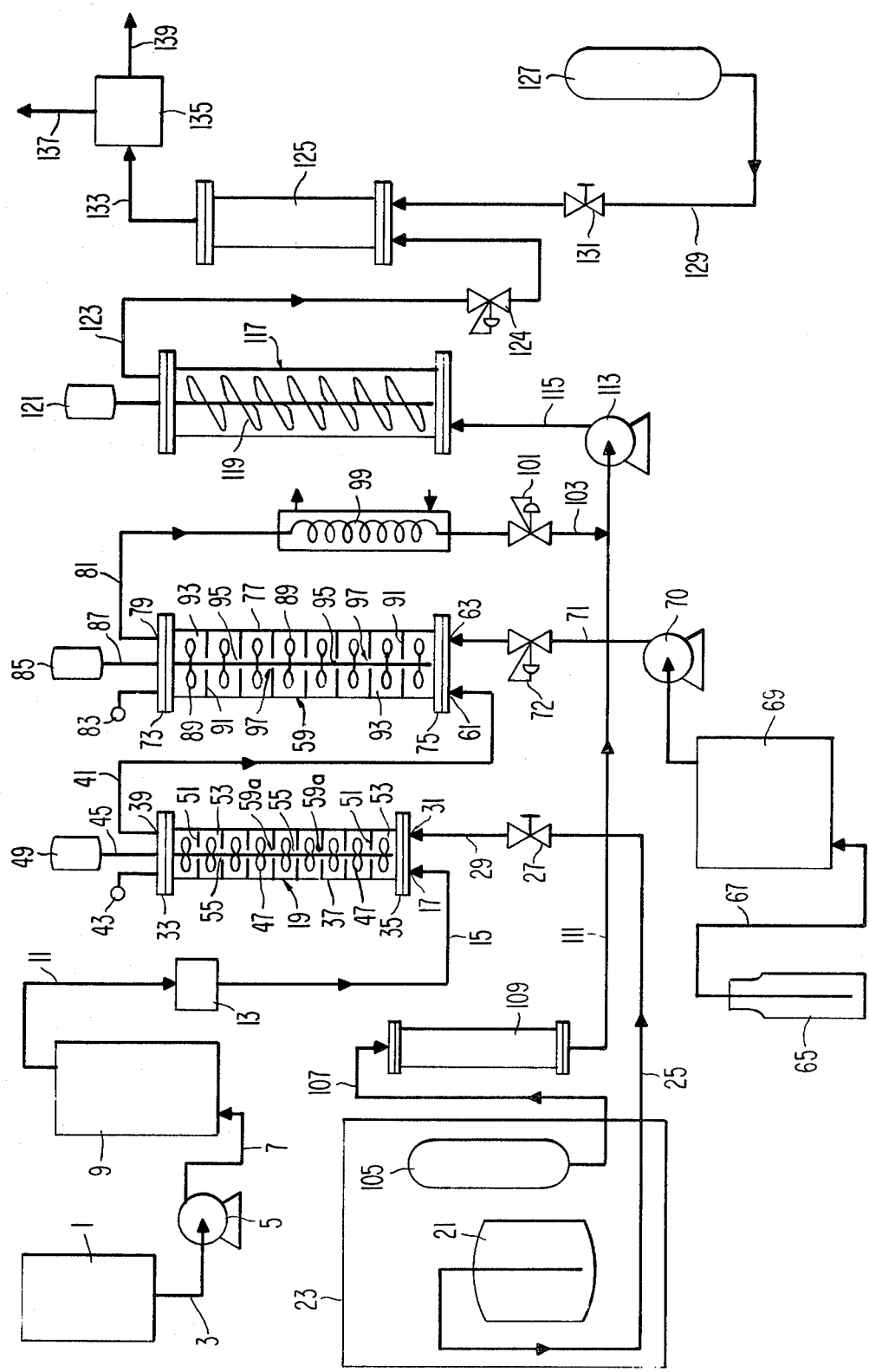

PROCESS FOR THE CONTINUOUS PRODUCTION OF STAR-BLOCK COPOLYMERS OF A MONOVINYL AROMATIC MONOMER AND A CONJUGATED DIENE

The present process is directed to a continuous process for forming star-block copolymers of a vinyl aromatic monomer and a conjugated diene.

Highly branched block copolymers, sometimes called star-block copolymers, are old in the art of anionic polymerization. These star-block copolymers are prepared by first forming linear block polymer having active lithium atom on one end of the polymer chain. These active, linear polymer chains are then coupled by the addition of a polyfunctional compound having at least three reactive sites capable of reacting with the carbon to lithium bond on the polymer chains to add the polymer chain onto the functional groups of the compound.

Zelinski, U.S. Pat. No. 3,280,084, polymerized butadiene with butyllithium initiator to form B-Li blocks (where B is polybutadiene) which when coupled with 0.02 to 1 part by weight per 100 parts of monomers of divinyl benzene gave star-block copolymers having polydivinyl benzene nuclei and several identical arms of polybutadiene branching therefrom. The arms can also be either random or block copolymers of styrene and butadiene (from A—B—Li blocks, where A is polystyrene segment) where the diene is the major component.

Zelinski, U.S. Pat. No. 3,281,383, teaches similar star-block copolymers to those in U.S. Pat. No. 3,280,084, except that coupling agents such as polyepoxy compounds, polyacids, polyaldehydes, etc., are used.

Childers, U.S. Pat. No. 3,637,554, prepares rubbery star-block copolymers having nuclei formed from polyepoxides, polyisocyanates, polyimines, etc., and identical arms from B-Li and A—B—Li.

Fetters et al, U.S. Pat. No. 3,985,830, discloses a product having a nucleus of more than one molecule of m-divinylbenzene and at least three polymeric arms, each being a block copolymer of conjugated diene and monovinyl aromatic monomers wherein said conjugated diene block is linked to said nucleus.

The above patents all suffer from the disadvantage of being lengthy batch processes which require cleaning out of the batch reactor after each run to prevent premature crosslinking.

Brady et al., U.S. Pat. No. 4,209,599, discloses a process for the continuous mass polymerization of monomers in the presence of free-radical initiators in a tubular reactor provided with internal static mixers. The process requires the tubular reactor also to be a loop reactor to allow for recirculation of the reaction mass to the reactor as feed. This recirculating reactor is not suitable for the preparation of block copolymers.

SUMMARY OF THE INVENTION

The present process provides for the continuous polymerization of star-block copolymers of a vinyl aromatic monomer and a conjugated diene using anionic solution polymerization in the presence of a hydrocarbyllithium initiator.

A vinyl aromatic polymer having a low weight average molecular weight to number average molecular weight ratio is formed in a first reactor by continuously feeding monomer in solution, and an initiator in solvent to the bottom zone of a first sealed, cylindrical, pressurized, vertical reactor and passing the mixture formed through successive zones to a top zone, where each zone is separated by separation plates having a central aperture, and a central mixing shaft having stirring means thereon passes through the aperture of each of the separation plates, the mixture continuously being passed to successive zones through the annular space formed between the shaft and each separation plate, and a pressure differential between successive zones being less than one pound per square inch. The solution of polymer being produced is continuously discharged from the first reactor and, along with a conjugated diene is fed to a second sealed, cylindrical, pressurized, vertical reactor having a bottom zone, top zone and a plurality of intermediate zones separated by separation plates, each having a central aperture and a mixing shaft passing therethrough and the mixture passing to successive zones through an annular space formed between the shaft and each separation plate. The solution of diblock copolymer produced is continuously removed from the top zone, of the second reactor and the solution of diblock copolymer is continuously mixed with a polyfunctional coupling agent in a third reactor to produce a star-block copolymer. The solution of star-block copolymer is continuously discharged from the third reactor and mixed with a terminating agent in a terminating reactor and separation of the resultant star-block copolymer from the inert solvent effected.

BRIEF DESCRIPTION OF THE DRAWING

The drawing is a flow sheet, diagramatically illustrating the process of the present invention.

DETAILED DESCRIPTION

Referring now to the drawing, a solution of monovinyl aromatic monomer in an inert solvent, from source 1, passes through line 3, pump 5 and line 7 to a purification system 9, such as a filter, drier and other purification means. The solution is then passed through line 11, preheating unit 13, and line 15 to an inlet 17 into the bottom zone of a continuous polymerizer 19. A solution of hydrocarbyllithium initiator in an inert solvent from source 21, under refrigeration in a refrigeration unit 23, is passed through line 25, valve 27, and line 29 into an inlet 31 into the bottom zone of the continuous polymerizer 19.

The continuous polymerizer 19 is a sealed, cylindrical, pressurized, vertical vessel having a top 33, bottom 35, and walls 37. The bottom 35 has inlets 17 and 31 for the admission of reactants, and the top 33 an outlet 39 for discharging polymer in solution from the vessel through line 41. A pressure relief valve 43 is provided, as is a mixing means comprising a shaft 45, impellers 47, and motor 49. The reactor has a series of separation plates 51 which subdivide the reactor into a plurality of zones 53, with each of the separation plates 51 having a central aperture 55 therethrough, through which the shaft 45 passes and forms an annular space 59a between the separation plate 51 and shaft 45, with the flow of reactants from each zone controlled by the dimensions of the annular spaces. The flow is controlled such that a pressure differential of less than about one pound per square inch is maintained between successive zones. The continuous polymerizer 19 is described in detail in the application of David S. Neiditch, Gerald A. Bullano, Robert J. DiLullo, David E. Ofstein, filed concurrently herewith and entitled "Process and Apparatus for Continuous Polymerization of a Monovinyl Aromatic Monomer", now U.S. Pat. No. 4,442,273 and the contents of said application are incorporated by reference herein.

The substantially monodisperse polymer in solution which is discharged from the continuous polymerizer 19, through outlet 39 into line 41, is passed to the bottom of a second sealed, cylindrical, pressurized vertical reactor 59 through an inlet 61. There is also added to the bottom of the second reactor 59, through inlet 63, a conjugated diene monomer, which monomer is fed from a source 65 through line 67, thence a purification system 69, to pump 70, to line 71, through valve 72 which leads to the inlet 63. The second continuous polymerizer 59 is similar to the first continuous polymerizer 19, except that the pressure differential between zones of the second continuous polymerizer need not be maintained at a value of below about one pound per square inch.

The second continuous polymerizer 59 is also comprised of a top 73, bottom 75, and walls 77. The bottom 75 has the inlets 61 and 63 for the admission of the solution of polymer and conjugated diene, respectively, and the top 73 has an outlet 79 for discharge of a solution of diblock copolymer formed in the polymerizer through line 81. A pressure relief valve 83 is provided, along with a mixing means comprising a motor 85, shaft 87 and impellers 89. This second reactor also has a series of separation plates 91 which subdivide the reactor into a plurality of zones 93, with each separation plate 91 having a central aperture 95 through which the shaft 87 passes. An annular space 97 is provided between the shaft 87 and each separation plate 91 through which the reactants flow from the bottom zone to successive upper zones and then out of the outlet 79 at the top 73 of the reactor 59 into line 81.

The diblock copolymer formed, in the second polymerization reactor, passing through line 81 is heated in a heat exchanger 99 and passes through a back pressure control valve 101 to line 103. The diblock copolymer from line 103 is mixed with a polyfunctional coupling agent from a refrigerated source 105 which has passed through line 107, purification system 109, and into line 111, with the two streams blended in a gear pump 113 and the blended material passed through line 115 into a third reactor 117. The third reactor 117 may comprise a screw conveying type system which provides mixing of the materials fed thereto and the has a screw-type mechanism 119 driven by a motor 121. The diblock copolymer and polyfunctional coupling agent, such as divinylbenzene, are admixed within the third reactor 117 whereby a star block copolymer is formed with the resultant star block copolymer discharged through line 123 through valve 124 and into a termination reactor 125 which employs a screw type reactor solution conveying element. There is also fed to the termination reactor a terminating agent, such as methanol, fed from a source 127, through line 129 and valve 131, to the termination reactor.

The final star-block block copolymer and solvent are discharged from the termination reactor 125 through line 133 and the solvent removed in desolventizer 135, with solvent flashed off through line 137 and the resultant polymer discharged through line 139.

The copolymers prepared by the present continuous process contain 20 to 55 percent by weight, preferably 30 to 50 percent by weight, of a monovinyl aromatic compound and 45 to 80 percent by weight, preferably 50 to 70 percent by weight, of a conjugated diene having 4 to 8 carbon atoms. The monomodal copolymers have the general formula $(A-B)_m X$ where A is a nonelastomeric polymer segment based on the total monovinyl aromatic compound, B is an elastomeric segment based on the conjugated diene, m is an integer between 3 and 20, preferably between 7 and 12, and X is the radical of a polyfunctional coupling agent forming the nucleus of the star-block copolymer.

The time of residence of the solution in the first reactor allows essentially complete polymerization of the vinyl aromatic compound to form linear segments (A—Li) of the compound having lithium ions at the ends. The rate of feed will vary depending on diameter of the tubular reactor and the length of the reactor. The concentration of the vinyl aromatic compound in inert solvent fed to the first reactor may vary, but should not exceed about 15 weight percent of monomer. The concentration should be chosen such that, when the vinyl aromatic compound and the conjugated diene have both polymerized completely, the resultant percent solids is not greater than about 25 weight percent.

Similarly, the residence time in the second reactor allows essentially complete polymerization of the conjugated diene monomer to form linear diblock segments (A—B—Li). The rate of feed of the diene monomer is varied to depend on the diameter of the second reactor and the length of the second reactor to maintain the desired residence time.

The residence time in the third reactor is sufficient to allow essentially complete coupling of the lithiated segments formed in the second reactor to form the star-block copolymers $(A-B)_m X$ or $(A-B)_m X-B)_n$ where A, B, X, m and n are as hereinbefore defined.

The residence time in the termination reactor is not critical because the termination reaction is essentially instantaneous.

The separation of the final star-block copolymer from the inert solvent can be accomplished by flashing off the majority of the solvent and then vacuum drying the residue to produce polymer in the form of crumb. The last drying can be accomplished by extrusion of the solution in a devolatilizing extruder followed by a pelletizing step. It is also possible to mix the solvent-/copolymer product immediate with mineral oil to form, on devolatilization, an oil-extended elastomer. Additionally, the other ingredients for shoe-sole compounds or adhesive compounds can be mixed with the mineral oil and copolymer/solvent product to form directly the final shoe-sole compound or adhesive compound in pellet form.

The monovinyl aromatic compound useful in the invention is preferably sytrene, but may be alkyl substituted styrenes which have similar copolymerization characteristics, such as, alpha-methylstyrene and the ring substituted methylstyrenes, ethylstyrenes and t-butylstyrene.

The amount of monovinyl aromatic compound useful in the invention is between 25 and 55 percent by weight, and preferably 30 to 50 percent by weight, based on the total weight of monomers utilized.

The hydrocarbyllithium initiators useful in the invention are the known alkyllithium compounds, such as methyllithium, n-butyllithium, sec-butyllithium; and cycloalkyllithium compounds, such as cyclo-hexyllithium; and the aryllithium compounds, such as phenyllithium, p-tolyllithium and naphthyllithium.

The amount of hydrocarbyllithium added should be between 0.2 and 10.0 millimoles per mole of monomer.

The amount of initiator used depends on the molecular weight desired.

The conjugated dienes useful in the invention are those having from 4 to 8 carbon atoms in the molecule, such as 1,3-butadiene, isoprene, 2,3-dimethyl-1,3-butadiene, piperylene and mixtures thereof.

The polymerization is conducted in an inert hydrocarbon solvent such as isobutane, pentane, cyclohexane, benzene, toluene, xylene and the like with cyclohexane preferred. The polymerization is carried out in the absence of air, moisture, or any other impurity which is known to be detrimental to anionic catalyst systems.

The polyfunctional coupling agents suitable for the invention may be any of the materials known to have functional groups which can react with carbon to lithium bonds to add the carbon chain to the functional group. Typical examples of the suitable coupling agents are the polyepoxides, such as epoxized linseed oil; the polyesters such as diethyl adipate; the polyhalides, such as silicon tetrahalide; the polyisocyanates, such as benzene-1,2,4-triisocyanate; the polyimines, such as tri(1-aziridinyl) phosphine oxide; the polyaldehydes, such as 1,4,7-naphthalene tricarboxaldehyde; the polyketones, such as 2,4,6-heptanetrione; the polyanhydrides, such as pyromellitic dianhydride; and the polyacid chlorides, such as mellitic acid chlorides. Especially useful and preferred herein, are the polyvinyl aromatic compounds such as divinylbenzene, which although only difunctional as monomers, can polymerize to form polyfunctional agents in situ and serve as coupling agents. Suitable are the ortho-, meta- or para- divinylbenzenes, or mixture thereof.

The amount and type of coupling agent used is dependent upon the number of polymer chains having lithium terminated ends and the number of arms desired per starblock molecule. Thus, for agents having a fixed number of functional groups such as silicon tetrachloride, an equivalent of agent per equivalent of lithium terminated polymer chains, gives a four armed starblock copolymer. In the case of difunctional agents which polymerize during the coupling reaction, such as divinylbenzene, the amounts of agent to be used must be determined for the conditions of reaction, since the number of equivalent functional sites is variable. However, the amounts will vary only from 1 to 10 parts by weight, and preferably 2.0 to 8.0 equivalents, of divinylbenzene per 1.0 equivalent of lithium initiator used.

EXAMPLE

A star-block copolymer consisting of a vinyl aromatic monomer and a conjugated diene can be prepared with the present invention. A copolymer with the weight ratio 46 styrene to 54 butadiene is illustrated. Flowrates and conversions are given for a product rate of 4.5 lb/hr at 25 weight percent polymer in cyclohexane solvent. The total mean residence time in the system, excluding termination, is approximately 110 minutes. Physical dimensions of the reactors and a run summary are shown in Table 1.

A 13.1 weight percent styrene in cyclohexane mix is prepared and stored in vessel 1 in FIG. 1. The premix is pumped from vessel 1 at 150 ml/min (15.5 g/min styrene), through purification columns, a preheater and into the styrene reactor at 75° C. The initiator, sec-butyllithium, is pressured from the refrigerated tank, 21, and fed to the styrene reactor, at 31, where the reaction is initiated. The estimated catalyst flowrate for a 28,000 polystyrene molecular weight is 0.6 ml/min, based on a catalyst molarity of 1.48 moles/liter and $2.7 \times 10^{-6}$ moles/gram impurities in the premix. The polystyrene solution leaving the first reactor flows into the butadiene reactor at inlet 61. Butadiene is pressured out of the cylinder, 65, at 29.3 ml/min (18.2 gm/min), purified and then mixed at room temperature with the hot polystyrene solution stream inside the 1st stage of the butadiene polymerizer; some of the exotherm will be absorbed in heating the reactor mass back up to 75° C. The remainder is removed by external means. Styrene/butadiene diblock exiting the butadiene reactor is then heated to 80° C. for the linking step. A refrigerated commercial 55 weight percent divinylbenzene mixture, (DVB), is pressured from 105 and through purification column 109. The DVB is blended with diblock via a gear pump at the rate of 0.32 ml/min. The solution then enters the DVB reactor. A conveying element in this reactor is used to help transport the solution and approach plug flow. The polymer/solvent star-block copolymer exits the DVB reactor and is blended with methanol, the terminating agent, in a static-type mixer. The solution then enters flash drum, 135, where the solvent is flashed-off and the resultant polymer is discharged.

TABLE 1

| Reactor | Physicals | Feed Stream | Flow Rate | Temperature | Conversion |
|---|---|---|---|---|---|
| Styrene | 2.4" Diameter<br>32.0" Length<br>9 Stages<br>14 minutes<br>residence time | Styrene/Cyclohexane Premix | 150 ml/min<br>15.5 g/min Styrene | 75° C. | 99.9% |
| Butadiene | 4.0" Diameter<br>42.4" Length<br>8 Stages<br>45 minutes<br>residence time | Sec-butyllithium<br>Butadiene | 0.6 ml/min<br>29.3 ml/min | 75° C. | 99.9% |
| Copolymer Coupling | 4.5" Diameter<br>35.4" Length<br>Screw type conveyor<br>50 minutes<br>residence time | DVB | 0.32 ml/min<br>(55 wt. % DVB commercial mixture) | 80° C. | 99+% |
| Termination | Static Mixer<br>15 minutes<br>residence time | Methanol | 0.16 m./min | 80° C. | 99.9% |

What is claimed is:

1. The process for the continuous anionic polymerization of star-block copolymers of a vinyl aromatic monomer and a conjugated diene monomer comprising:

(a) producing a polymer having a low weight average molecular weight to number average molecular weight ratio from a vinyl aromatic monomer by continuously feeding a solution of vinyl aromatic monomer in an inert solvent and a hydrocarbyllithium initiator in an inert solvent to form a first mixture in the bottom zone of a first, sealed, cylindrical, pressurized, vertical reactor having a bottom zone, a top zone, and a plurality of intermediate zones, each said zone separated from a adjacent zone by separation plates having a central aperture therethrough, and stirring means carried by a central shaft passing through said apertures with an annular space provided between the shaft and each said separation plate;

continuously passing said first mixture from the bottom zone to successive zones through the annular space between the shaft and each said separation plate, said annular space being dimensioned so as to provide a high interstage velocity relative to superficial velocity and a pressure differential of less than one pound per square inch between said successive zones;

stirring said first mixture while passing the same through each zone; and continuously removing a solution of a polymer of said vinyl aromatic monomer from the top zone of said first reactor;

(b) continuously feeding said solution of polymer and a conjugated diene monomer to form a second mixture in the bottom zone of a second, sealed, cylindrical, pressurized, vertical reactor having a bottom zone, a top zone, and a plurality of intermediate zones, each said zone being separated from an adjacent zone by separation plates having a central aperture therethrough, and stirring means carried by a central shaft passing through said apertures with an annular space provided between the shaft and each said separation plate;

continuously passing said second mixture from the bottom zone to successive zones through the annular space between the shaft and each said separation plate, said annular space being dimensioned so as to provide a high interstage velocity relative to superficial velocity and a pressure differential of less than one pound per square inch between said successive zones;

stirring said second mixture while passing the same through each zone; and continuously removing a solution of diblock copolymer from the top zone of the second reactor;

(c) continuously feeding said solution of diblock copolymer and a polyfunctional coupling agent to a third reactor to produce a star-block copolymer and continuously discharging a solution of the star-block copolymer therefrom;

(d) continuously mixing said solution of star-block copolymer with a termination agent in a termination reactor; and (e) separating the resultant star-block copolymer from the inert solvent.

2. The process as defined in claim 1 wherein the weight of monovinyl aromatic compound to conjugated diene is from 25/75 to 55/45 percent by weight.

3. The process as defined in claim 1 wherein said monovinyl aromatic monomer is selected from the group consisting of styrene and alkyl substituted styrenes.

4. The process as defined in claim 1 wherein said conjugated diene is selected from the group consisting of 1,3-butadiene, isoprene, 2,3-dimethyl-1,3-butadiene, piperylene and mixtures thereof.

5. The process as defined in claim 1 wherein the monovinyl aromatic monomer is styrene, the conjugated diene is 1,3-butadiene, and the polyfunctional coupling agent is selected from o-divinylbenzene, m-divinylbenzene, p-divinylbenzene and mixtures thereof.

6. The process as defined in claim 1 wherein said hydrocarbyllithium initiator is sec-butyllithium.

7. The process as defined in claim 1 wherein said inert solvent is selected from the group consisting of isopentane, pentane, cyclopentane, cyclohexane, benzene, toluene, xylene, and mixtures thereof.

* * * * *